United States Patent [19]

Tahara

[11] 4,320,677
[45] Mar. 23, 1982

[54] DRIVING SYSTEM

[76] Inventor: Yoshinori Tahara, No. 101-1, Higashishiiji, Numazu-shi, Shizuoka-ken, Japan

[21] Appl. No.: 173,729

[22] Filed: Jul. 30, 1980

[30] Foreign Application Priority Data

Aug. 7, 1979 [JP] Japan ............................. 54-100392
Apr. 21, 1980 [JP] Japan ............................. 55-52758

[51] Int. Cl.³ ........................................... B23D 19/00
[52] U.S. Cl. ................................. 83/508.2; 83/499; 83/504; 74/424.8 R; 192/48.3
[58] Field of Search ................. 83/343, 499, 501, 502, 83/504, 506, 507, 508.2, 508.3; 74/57, 424.8 R; 192/48.3, 80, 85 CA, 87.11, 88 B

[56] References Cited

U.S. PATENT DOCUMENTS

| 2,205,989 | 6/1940 | Meyers et al. | 192/85 CA X |
| 3,886,833 | 6/1975 | Gunn et al. | 83/504 X |
| 4,077,291 | 5/1978 | Obenshain | 83/508.3 X |
| 4,211,135 | 7/1980 | Wehde | 83/499 |
| 4,269,097 | 5/1981 | Linn | 83/504 |

FOREIGN PATENT DOCUMENTS

53-107498 6/1978 Japan .
54-63473 4/1979 Japan .

*Primary Examiner*—Frank T. Yost
*Assistant Examiner*—Robert P. Olszewski
*Attorney, Agent, or Firm*—Brumbaugh, Graves, Donohue & Raymond

[57] ABSTRACT

A driving system of the type wherein a driving screw shaft is used and one or more units can be selectively moved along the shaft is disclosed. The driving system comprises a driving screw shaft extending through the slide base of a unit to be driven and provided at its periphery with a slide key way extending in the direction of the longitudinal axis of the shaft, a driving source for rotating the screw shaft, a female screw meshed with the screw shaft and provided in the slide base of the unit for rotation with respect to the slide base, a first clutch provided between the slide base and the female screw for coupling and decoupling the slide base and the female screw, a second clutch provided around the screw shaft for rotation together with the screw shaft with respect to the slide base and movable in the direction in which the slide key way extends, the second clutch being able to be coupled with and be decoupled from the female screw, and a controller for controlling actuations of the first and second clutches.

5 Claims, 1 Drawing Figure

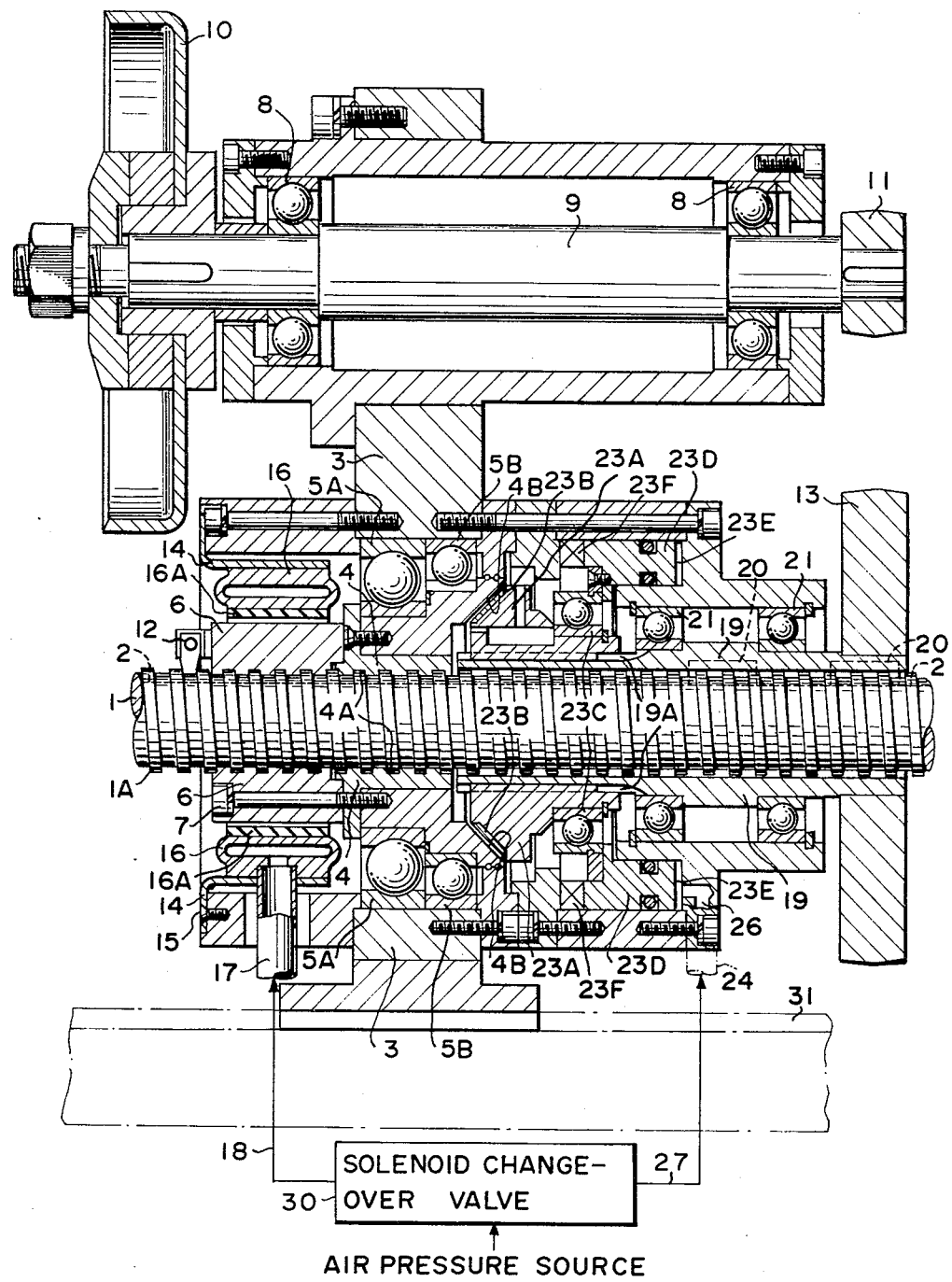

DRIVING SYSTEM

BACKGROUND OF THE INVENTION

1. Field of the Invention

This invention relates to a driving system of the type wherein a driving screw shaft is used and one or more units can be selectively moved along the shaft, and more particularly, to a driving system for use in a slitter for slitting a sheet material such as a long, narrow strip of paper to two or more strips having predetermined widths.

2. Description of the Prior Art

In such driving system for a slitter, it is desired to easily and accurately position slitting blade or blades so that a sheet material can be slitted to two or more strips having desired widths. It is also desired that the system is simple. In Japanese Patent Application No. 107498/1978 (see Japanese Patent Application Public Disclosure No. 63473/1979), there has been proposed a slitter driving system comprising a slitter driving screw shaft, female screws meshed with the screw shaft and clutches each associated with each female screw for coupling the female screw with the slitter bracket of the corresponding slitting blade. In this system, the selective movement of the slitter blades can be effected by rotating the screw shaft and actuating only the ones of the clutches with which the slitter brackets to be desired to be moved are associated, thereby mechanically coupling the selected slitter brackets with the associated female screws to permit the female screws of the selected slitter brackets to rotate and move relatively to the screw shaft, i.e., to cause only the selected female screws and thus the selected slitter brackets to be moved along the screw shaft. This slitter driving system is very simple in structure and inexpensive, since the selective movement of the slitting blades is performed only by driving the common screw shaft and selectively actuating the clutches, as described above. However, in this driving system, the female screws tend to rotate and move relatively to the screw shaft due to inertia or friction of the female screws meshed with the screw shaft even if the associated clutches are not actuated while the screw shaft is rotated. This would lead to inaccurately positioning of the slitting blades. Moreover, this driving system needs two separate driving mechanisms for respective rotations of the slitting blades and the screw shaft.

Therefore, it is an object of this invention to provide a very simple and inexpensive driving system wherein one or more units such as slitting knives can be easily and accurately positioned.

It is another object of this invention to provide such a driving system wherein positioning of each unit and operating of each unit can be effected by way of a common driving source.

SUMMARY OF THE INVENTION

According to this invention, there is provided a driving system of the type wherein a driving screw shaft is used and one or more units can be selectively moved along the shaft, comprising a driving screw shaft extending through the slide base of a unit to be driven and provided at its periphery with a slide key way extending in the direction of the longitudinal axis of the shaft, a driving source for rotating the screw shaft, a female screw meshed with the screw shaft and provided in the slide base of the unit for rotation with respect to the slide base, a first clutch provided between the slide base and the female screw for coupling and decoupling the slide base and the female screw, a second clutch provided around the screw shaft for rotation together with the screw shaft with respect to the slide base and movable in the direction which the slide key way extends, the second clutch being able to be coupled with and be decoupled from the female screw, and a controller for controlling actuations of the first and second clutches.

This invention will be described in further detail in connection with an embodiment as shown in the accompanying drawing.

BRIEF DESCRIPTION OF THE DRAWING

The accompanying drawing shows a longitudinally sectional view of a portion of a slitter driving system according to this invention.

DESCRIPTION OF THE PREFERRED EMBODIMENTS

In the accompanying drawing, there is shown a slitter driving system comprising a slitter driving screw shaft 1 which horizontally extends. The screw shaft 1 is provided at its periphery with a slide key way 2 extending in the direction of the longitudinal axis of the shaft 1. The screw shaft 1 is designed to be rotated by a suitable driving source (not shown). A female screw 4 having an internal thread 4A meshed with the external thread 1A of the screw shaft 1 is connected to a lower slitting blade slide base 3 through bearings 5A and 5B for rotation within the base 3. The slide base 3 is movable over a slide beam 31. A lower slitting blade rotating shaft 9 is mounted on the upper portion of the slide base 3 for rotation at bearings 8. A lower slitting blade 10 is removably mounted on the rotating shaft 9 at the left end (as viewed in the drawing). A pulley 11 is secured to the right end of the rotating shaft 9. The pulley 11 is operatively connected to a pulley 13 to be described hereinafter, by means of a driving belt (not shown). An air clutch 16 is secured to the slide base 3 by means of a fixture 14 and fastening bolts 15. An air pressure can be applied to the clutch 16 from an air pressure source through a solenoid change-over valve 30, an air conduit 18 and a supply passageway 17 provided in the slide base 3. When any air pressure is not applied to the air clutch 16, the brake shoe 16A of the clutch 16 is not pressed against the periphery wall of a back-lash adjusting female screw 6 which is secured to the female screw 4 by means of a back-lash adjusting bolt 7, as shown in the drawing, and therefore the female screw 4 is decoupled from the slide base 3. On the other hand, when an air pressure is applied to the clutch 16, the brake shoe 16A is pressed against the periphery wall of the back-lash adjusting female screw 6 with a predetermined pressure and therefore the female screw 4 is integrally coupled to the slide base 3. The back-lash adjusting female screw 6 may be provided with a screw cleaner 12 which can engage with the valley of the external thread 1A of the screw shaft 1 to clean it.

Furthermore, a spline shaft 19 is provided in the screw shaft 1. The spline shaft 19 is provided with slide keys 20 which engage with the slide key way 2 of the screw shaft 1. Also, the spline shaft 19 is provided at the periphery of the left side (as viewed in the drawing) with longitudinal key ways 19A. An air clutch actuator 23A is provided in the spline shaft 19 with the keys of the actuator 23A engaging the key ways 19A of the spline shaft 19. A brake shoe 23B is attached to the frust-conical surface of the left end of the actuator 23A. The actuator 23A is mechanically connected at its right end to an air clutch working piston 23D through a ball bearing 23C. The working piston 23D is longitudinally movable within an air clutch cylinder 23E formed in the base 3. The bearings 21 and 23C permit the spline shaft 19 and the actuator 23A to be rotated within the base 3. Thus, the spline shaft 19 is movable along the slide key way 2 in the direction of the longitudinal axis of the screw shaft 1 and can be rotated together with the screw shaft 1 through the slide keys 20 when the screw shaft 1 is rotated. An air pressure can be applied from the air pressure source to the air clutch cylinder 23E through the solenoid change-over valve 30, an air conduit 27 and supply passageways 24 and 26 formed in the base 3. When any air pressure is not applied to the cylinder 23E, the piston 23D is displaced to the right side due to biasing force by a dished spring 23F and therefore the brake shoe 23B attached to the actuator 23A is not pressed against the frust-conical inner surface 4B of the right end of the female screw 4, as shown in the drawing. In this condition, the spline shaft 19 is decoupled from the female screw 4. When an air pressure is applied to the cylinder 23E, the piston 23D is moved to the left side against biasing force of the dished spring 23F and therefore the actuator 23A is also moved to the left side along the key ways 19A of the spline shaft 19 through the bearing 23C until the brake shoe 23B is pressed against the frust-conical inner surface 4B of the female screw 4 with a predetermined pressure, thereby coupling the spline shaft 19 with the female screw 4. The spline shaft 19 is provided at it right end with the pulley 13 which can be operatively connected to the pulley 11 of the rotating shaft 9 through a timing belt (not shown) to rotate the shaft 9.

Operation of the slitter driving system as described above will be described.

Firstly, in setting or changing the slitting width in the driving system, it is assumed that it is necessary to move the lower slitting blade 10 longitudinally of the screw shaft 1. The solenoid change-over valve 30 is switched so that an air pressure is applied to the air clutch 16 and no air pressure is applied to the air clutch cylinder 23E. In this condition, the back-lash adjusting female screw 6 and the female screw 4 is coupled to the slide base 3 through the air clutch 16. Therefore, when the screw shaft 1 is rotated, the female screw 4 is rotated relatively to the screw shaft 1, thereby resulting in longitudinal movement of the female screw 4 and thus the slide base 3 and the lower slitting blade 10 with respect to the screw shaft 1. On the other hand, since the air clutch actuator 23A is not energized, the spline shaft 19 is decoupled from the female screw 4. Therefore, the spline shaft 19 is rotated together with the screw shaft 1 within the base 3 at the bearings 21 and 23C, independently of the female screw 4, and the slide keys 20 are slid along the slide key way 2 as the base 3 is moved, whereby the spline shaft 19 is moved together with the base 3 longitudinally of the screw shaft 1. It will be easily understood that if the screw shaft 1 is rotated in the opposite direction, the lower slitting blade 10 can be moved longitudinally of the screw shaft 1 in the opposite direction.

Secondly, it is assumed that it is necessary not to move the lower slitting blade 10 longitudinally of the screw shaft 1 while the screw shaft 1 is rotated. The solenoid change-over valve 30 is switched over so that an air pressure is applied to the air clutch cylinder 23E and no air pressure is applied to the air clutch 16. In this condition, the spline shaft 19 is rotated within the base 3 together with the screw shaft 1 as the screw shaft 1 is rotated, in the manner previously described. Then, the spline shaft 19 is coupled with the female screw 4 through the air clutch actuator 23A. On the other hand, since the air clutch 16 is deenergized, the back-lash adjusting female screw 6 and the female screw 4 are decoupled from the base 3. Therefore, the spline shaft 19, the actuator 23A, the female screw 4 and the back-lash adjusting female screw 6 are rotated within the base 3 together with the screw shaft 1 at the bearings 21, 23C, 5B and 5A. In this manner, the female screw 4 and the screw shaft 1 are integrally rotated at the same speed. Therefore, the meshing of the external thread 1A with the internal thread 4A causes no relative rotation between the female screw 4 and the screw shaft 1. For this reason, the female screw 4 and thus the base 3 and the lower slitting blade 10 are completed prevented from being moved longitudinally of the screw shaft 1 owing to rotation of the screw shaft 1.

In this case, if the pulley 13 is operatively connected to the pulley 11 by means of a belt (not shown), the lower slitting blade 10 may be rotated as the screw shaft 1 is rotated. The belt may be associated with the pulley 11 through a one-way clutch to prevent the slitting blade 10 from being reversely rotated in connection with the direction of the movement of a sheet material such as a paper strip to be slitted. This makes it possible to successfully cut the sheet material even when the slitting blade is moved to be positioned.

Although the driving system has been described only for one lower slitting blade, it will be easily understood that the slitter may include one or more similar lower slitting blade units and corresponding upper slitting blade units. In such multi-unit system, it is possible to set or change the spacings between adjacent slitting blades by controlling the air clutches 16 and 23A to 23F of each unit so that the slitting blades may be moved longitudinally of the screw shaft or stand still.

As will be seen from the foregoing, according to the structure of the driving system of this invention, it is possible to move slitting blades by rotation of a screw shaft and completely prevent the movement of the slitting blades which should not be moved, whereby the slitting widths can be accurately set at any time. In addition, it is possible to rotate slitting blades by the rotation of the screw shaft, whereby only one common driving source is required. This will result in a simpler, smaller and more inexpensive slitter driving system. Furthermore, in the illustrated embodiment of this invention, since no rotationally contacting part such as a rotary joint is included, no problem such as generation of heat or overheating is caused.

Finally, although the driving system of this invention has been described for use in a slitter, this invention is not limited to such use. Rather, this invention may be advantageously applied to other driving systems of the type wherein a driving screw shaft is used and one or more units can be selectively moved along the shaft.

What is claimed is:

1. A driving system of the type wherein a driving screw shaft is used and one or more units can be selectively moved along the shaft, comprising a driving screw shaft extending through the slide base of a unit to be driven and provided at its periphery with a slide key way extending in the direction of the longitudinal axis of said shaft, a driving source for rotating said screw shaft, a female screw meshed with said screw shaft and provided in the slide base of said unit for rotation with respect to said slide base, a first clutch provided between said slide base and said female screw for coupling and decoupling said slide base and said female screw, a second clutch provided around said screw shaft for rotation together with said screw shaft with respect to said slide base and movable in the direction which said slide key way extends, said second clutch being able to be coupled with and be decoupled from said female screw, and a controller for controlling actuations of said first and second clutches.

2. A driving system as defined in claim 1 wherein said second clutch comprises a clutch actuator provided around said screw shaft for rotation together with said screw shaft with respect to said slide base and movable with respect to said slide base and said screw shaft in the direction which said slide key way extends, to thereby be coupled with or be decoupled from said female screw, and clutch driving means provided in said slide base for moving said clutch actuator in said direction, but allowing said rotation of said clutch actuator.

3. A driving system as defined in claim 2 wherein said clutch actuator is provided in a spline shaft so that said clutch actuator may be slidable in the direction of the longitudinal axis of said screw shaft, said spline shaft being slidably fitted to said slide key way of said screw shaft and connected through a bearing to said slide base.

4. A driving system as defined in claim 3 wherein said spline shaft is provided with transmission means for transmitting driving force to said unit.

5. A driving system as defined in claim 1 or 2 or 3 or 4 wherein said unit comprises a slitting blade.

* * * * *